Oct. 16, 1956        F. C. SLOAN        2,767,099
CUSHIONING AND DISPLAY PACK FOR SOFT AND PERISHABLE FRUITS
Filed Sept. 25, 1953
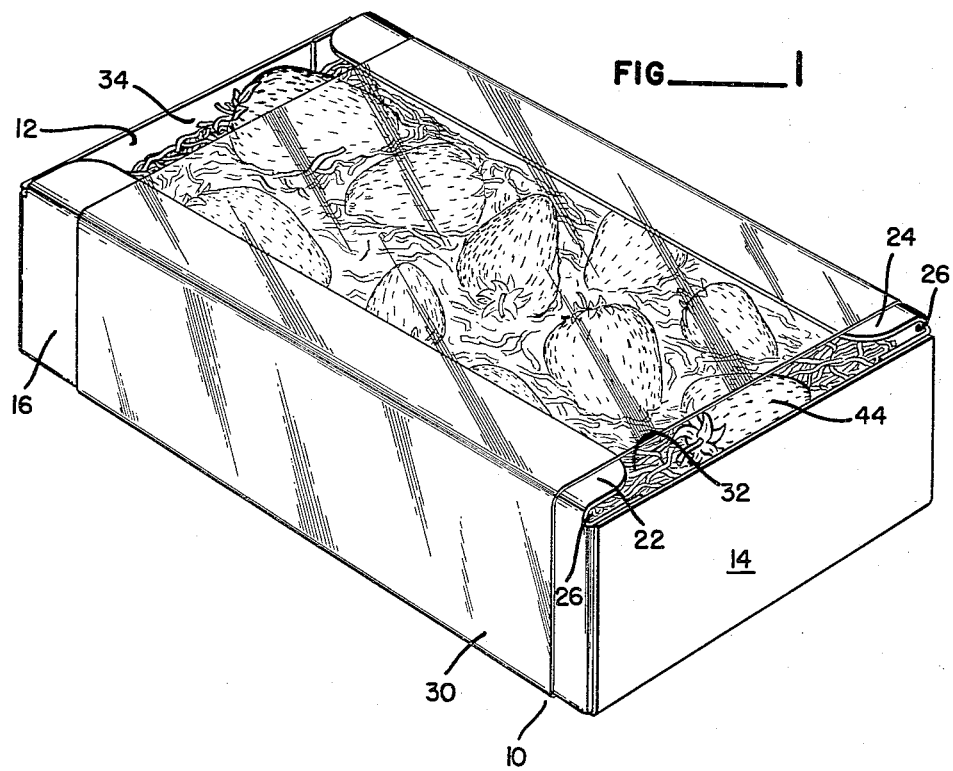
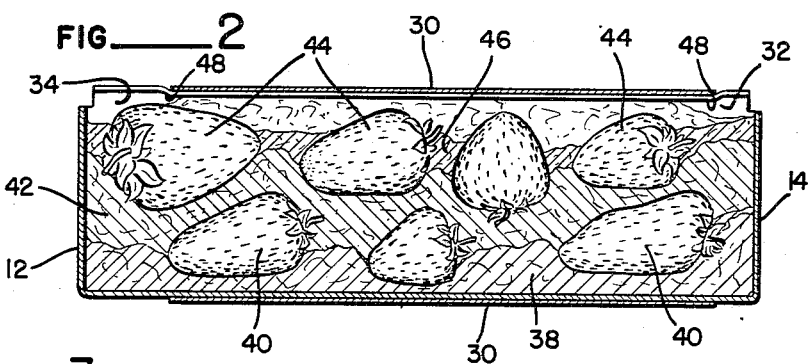
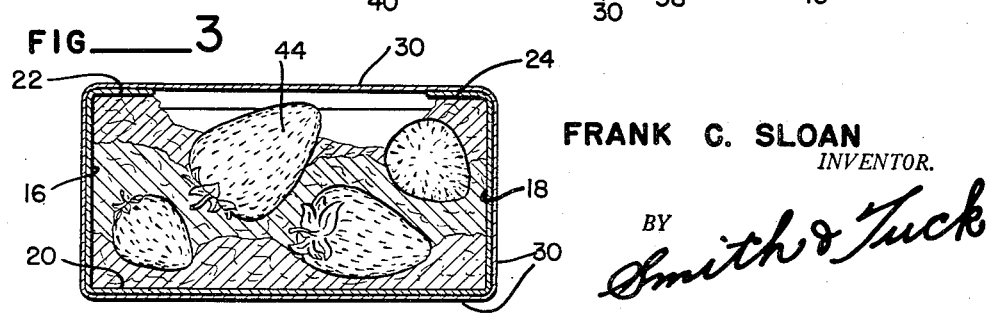
FRANK C. SLOAN
*INVENTOR.*
BY Smith & Tuck United States Patent Office 2,767,099
Patented Oct. 16, 1956

2,767,099

CUSHIONING AND DISPLAY PACK FOR SOFT AND PERISHABLE FRUITS

Frank C. Sloan, Bellingham, Wash.

Application September 25, 1953, Serial No. 382,314

6 Claims. (Cl. 99—171)

This present invention relates to the general art of fruit packaging and more particularly to a special pack for soft fruits, soft vegetables and the like which will serve to safely transport the fruits to their market; will retain them in a sanitary condition, and will provide an effective display for these fruits and vegetables when the same are placed on sale. The objects of this invention are obtained by a special container in which the fruit is packed in shredded sterile packing, and which packing is also disposed between successive layers of the fruit with an adequate spacing between the fruit so that the packing will hold them out of contact with each other. The packaging is then completed by a protective transparent envelope, to the end that the fruit or soft vegetables will be received by the user in substantially the same condition in which they left the producer's farm.

The handling of soft fruits and soft vegetables has been one of continual change and in this change it has merely kept pace with developments in transportation. Initially a farmer raised fruit for his own use or the use of those persons who lived close enough to him to conveniently carry the product home with him.

Gradually transportation facilities have improved to the extent that it is not now uncommon to ship strawberries several thousand miles to the receptive markets and thus it is possible to take full use of the unusually favorable conditions in certain localities for certain fruits and to then ship the fruits to the large centers of population.

A careful study of fruit handling means today will indicate that while the mode of shipping has changed, and refrigeration has greatly assisted in the long distances that fruit may be transported, the container has changed but little, if any. It is still most common to provide a basket made from wood veneer, then to enclose a plurality of these baskets in a larger container or crate in which they are shipped. Wood, even in light or thin sections has been generally accepted as the better way of forming these cases due to the stiffness of the wood and the fact that it does not deteriorate under the action of moisture, even rain or the natural juices of the fruits which may be exuded from them due to pressure, vibration or jar. These wood containers, however, offer little real protection to the fruit. They do not prevent the introduction of rain, or moisture from fog and the like. Dust, dirt in many forms, insects and the like have always had free access to the fruit and when the fruits are received at the point of disposal it is very common for them to be damaged from incidents of their transportation or deteriorated through pressure, to the end that many times only a portion of the fruit purchased by the ultimate consumer, the housewife, could actually be served to her family and this wastage of unusable fruit has added materially to the net cost of the fruit she had available to serve. In this present packaging arrangement, as made the subject of this present invention, steps have been taken that normally will insure that the fruit will be received by the housewife substantially in the condition in which they left the producer's farm, and when the housewife buys fruit packaged in this present mode she can depend upon serving one hundred percent of her purchase. It therefore follows that this new form of packaging could actually cost considerably more than that formerly employed and yet a net gain would be shown in true valve. Study, however, has proven that this new method of packaging will in most cases be very comparable to the cost of the former methods of packaging which did not have the many advantages inherent in this new form.

The principal object of this invention is to provide a package means for soft fruits and the like in which fruits can be placed by the producer and which packaging will protect the fruit in transit from climatic conditions, from the hazards of transportation, from contamination, and which will also permit the purchaser to view her purchase before buying the same and when the fruit is processed for use the same will be usable, in its entirety, as food.

A further object of this invention provides a fibrous container so formed that it may be shipped in a flat form and when assembled and packed and finally enclosed in a transparent tube will have sufficient rigidity to give the fruit ample protection for the transportation and handling period between the producer and the consumer.

A further object of this invention is to provide sterile non-hydroscopic shredded packing material which will hold the fruit in position and provide a resiliency that will insure it against damage while at the same time providing a filter to prevent dirt or insects from reaching the fruit.

A further object of this invention is to provide for ventilation of the gruit product to take care of varying temperature and climatic conditions which might otherwise tend to cause spoilage within the fruit, this ventilating means to be achieved by a circulatory system within the package.

A further object of this invention is to provide a box which can be easily assembled and which when packed can easily be enclosed by a surrounding tube of transparent waterproof material which cooperates with the box cover to prevent accidental distortion of the container's sides or ends which might otherwise tend to damage the contents.

A further object is to provide a transportation and display container for soft fruits and the like so arranged as to give the purchaser an excellent view of the top layer of the contents yet still deny the customer's handling of the product as so often occurs under the guise of inspecting the goods and which is a well recognized source of damage and contamination.

Further objects, advantages and capabilities will be apparent from the description and disclosure in the drawings, or may be comprehended or are inherent in the device.

In the drawings:

Figure 1 is a perspective view showing a preferred form of embodiment of this present invention.

Figure 2 is a typical longitudinal sectional view through the container and its contents as shown in Figure 1.

Figure 3 is a cross-sectional view representing a typical transverse section through the container of Figure 1.

Referring more particularly to the disclosure in the drawings, the numeral 10 designates generally the container forming the main enclosure of this packaging arrangement. This container may be made from any suitable material, however, considering stiffness and attractiveness, many of the commercial cardboards used in the box making industry prove to be very satisfactory. Appearance and general cleanliness indicate the cardboard having an outer semi-glazed surface is probably the best all-around choice. The construction of the container is greatly simplified in that no enclosing cover is required as part of the container structure. It is normally formed having the two ends as 12 and 14, the two sides as 16 and 18, and a connecting bottom 20. These members are normally all formed of a single piece and are secured in box-like form by conventional means. To strengthen the upper side margins of the box which have the greatest lineal extent the form illustrated in Figures 1 and 3 has proven very effective. In this, inturned margin pieces as 22 and 24 are provided throughout the length of the two sides and these are formed with a relatively large radius at 26 to the end that the top surface of tabs 22 and 24 will be raised appreciably above the upper margin of end portions 12 and 14. These inturned tabs serve several purposes. They stiffen the upper long margins of the sides; they protect the fruit adjacent the upper corners along the sides, and they provide a resilient tightening for the outer covering 30.

The outer covering is preferably made from transparent sheet material which should be selected of a type that is chemically neutral, and preferably one that does not stretch or change lineal dimension under the influence of changing temperatures. It should further be impervious to moisture, dust and the like. It may or may not be colored depending upon the type of product being packaged. While there are many cellulose base materials that meet these general specifications those made of viscous or cellulose acetates have been proven satisfactory for this purpose. Attention is directed to the showing of covering 30 throughout the drawings accompanying this specification. It will be noted that the open space provided at 32 is appreciably less than that provided at the opposite end 34. The lengths of these two openings may be varied in accordance with experience in a particular locality, however, it has been found that if for instance end opening 32 is substantially one half of the larger end opening 34, that when there is a difference in temperature between the ambient air and the air within the package, which in turn reflects the temperature of the contents of the package, then there will be a convexional circulation of the air. This provides ventilation of a very desirable order and one which occurs timely. Normally when the ambient air and the fruit temperature and the package temperature are all the same there is going to be no gain by a circulation of air. However it is change of temperature that produces precipitation, dehydration or hydration of the fruit and packaging materials. Therefore when the conditions are different circulation is desirable and following the normal laws of convexion this circulation will be provided with this form of packaging.

Referring to the cross-sectional views of Figure 2 and Figure 3 the preferred method of packaging will be apparent. Normally, when the fruit is first placed in the container the lower row is placed upon a (previously placed) bottom layer of packing material as 38. Then, after a layer of fruit has been placed upon this material, indicated by the fruit at 40, another layer of packing material as 42 is employed and then another layer of fruit as 44. When this layer is in place a covering and retaining layer of packing material 46 is employed. This material is distributed around the fruit comprising the upper layer in such a manner as to position the fruit in place and to leave a good portion of the same visible so that it may be inspected at will through the transparent covering 30. In placing the fruit within the container following the showings of Figures 2 and 3 it is desirable that the fruit does not touch the container at any point and further that the fruits do not touch each other. This is to insure that during handling, shipping, and displaying the fruits will not be rubbed together and bruised or chafed, nor will they be bruised by outside agencies that might tend to dent the walls of the container.

Preferred materials for these layers of packing 38, 42, and 46 are a shredded cellulose material which preferably is transparent in form but tinted with a color contrasting with the fruit or vegetable product being packed. Cellulose sheet of rather light gauge, when shredded or curled and intertwined after the fashion well known in making excelsior forms an ideal packing material. It is chemically inert itself, it is naturally resilient, and forms an excellent filter preventing the easy entrance of dirt, insects, and the like into the body of the container, but at the same time it permits a flow of air through the package which contributes to the longer keeping of the contained fruit. In the packaging of strawberries, or other red berries, green tinted cellulose type excelsior has provien to be the most desirable packing material. This packing is normally formed, however, in a loose blanket of which a number of different thicknesses should be supplied to the packers so that the thickness of the blanket can be matched to the size of the berries being packed.

In a package of this order it is well recognized that within a given cubicle content a considerably lesser number of berries can be packed than when sent in the usual container where the berries are packed tightly together resting against each other all ways. When strawberries, for instance, are packed after the showing of the drawings, the cubicle content of the container 10 should preferably be about twice that of the usual container which involves no packing material. Conditions will vary somewhat with different edibles; some of the premium type of soft vegetables can be packed with considerably less loss of space due to their own inherent bulk and weight.

As a final protective covering the cellulose sheet material forming the covering 30 is preferably joined so as to form a tubular envelope which is open at both ends. By using a tubular stock of the proper dimensions it is very simple to produce a package that can be quickly assembled and in which the envelope can be quickly put in place without the use of expensive equipment. This type of packaging normally will find its greatest use in premium fruits and vegetables which normally will involve considerable hand packing. It is then desirable that as soon as the packing is completed the packer can slide the enclosing envelope 30 in place and thus complete the packing. The tensioning of envelope 30 is greatly assisted by the return bend portions 26 formed in tabs 22 and 24. Some form of retaining means is desirable to prevent any longitudinal shifting of the envelope 30. A preferred means is indicated, especially in Figure 2, wherein tabs 22 and 24 are inwardly depressed at 48 for a distance equal to the length of the envelope. This arrangement holds envelope 30 in its normal position but does not materially hinder the placement or removal of the same. This construction will be easily observed in Figures 1 and 3. This resiliency keeps the enclosing cover 30 taut at all times; adds to the appearance of the package, and to the ability to observe the contents through the transparent envelope 30; and because it presents a smooth surface which discourages the lodgement of dust or other foreign materials which would detract so much from the over-all appearance and cleanliness of this form of packing.

It is believed that it will be clearly apparent from the above description and the disclosure in the drawings that the invention comprehends a novel construction of a cushioning and display pack for soft and perishable fruits.

Having thus disclosed the invention, I claim:

1. The improvement in a package for soft perishable fruit, comprising: a box formed of stiff cardboard having solid bottom, side and end walls and an open top, said side walls each having a normally upright integral tab extending throughout the major portion of its upper edge, an open-ended tube of transparent material encircling and extending across the bottom and side walls of said box and across said open top and bending said tabs down to a level slightly above the end walls whereby the tabs resiliently press said tube securing it in position, the ends of said tube being spaced a short distance from the end walls of said box forming air passageways permitting air flow therebetween, one end of the tube being spaced from its adjacent end wall approximately double the distance that the other end of the tube is spaced from its adjacent end wall, a plurality of layers of said fruit positioned in said box and layers of shredded cellulose sheet material chemically neutral to said fruit and formed in the manner of excelsior separating said layers of fruit, separating the fruit in each layer, and spacing the fruit from the side, end and bottom walls of said box, the top layer of said fruit being exposed to view through said transparent tube.

2. The improvement in a package for soft perishable fruit, comprising: a box formed of cardboard having bottom, side and end walls and a substantially open top, said side walls each having a normally upright integral tab extending throughout the major portion of its upper edge, an open-ended tube of transparent material encircling and extending across the bottom and side walls of said box and across said open top and bending said tabs down whereby the tabs resiliently press said tube securing it in position, the ends of said tube being spaced a short distance from the end walls of said box forming air passageways permitting air flow therebetween, a plurality of layers of said fruit positioned in said box and layers of shredded cellulose sheet material chemically neutral to said fruit and formed in the manner of excelsior separating said fruit, the top layer of said fruit being exposed to view through said transparent tube.

3. The improvement in a package for soft perishable fruit, comprising: a box formed of stiff cardboard having solid bottom, side and end walls and an open top, said side walls each having a normally upright integral tab extending throughout the major portion of its upper edge, an open-ended tube of transparent material encircling and extending across the bottom and side walls of said box and across said open top and bending said tabs down to a level slightly above the end walls whereby the tabs resiliently press said tube securing it in position, the ends of said tube being spaced a short distance from the end walls of said box forming air passageways permitting air flow therebetween, one end of the tube being spaced a substantially greater distance from its adjacent end wall than the other end of the tube is spaced from its adjacent end wall.

4. The improvement in a package for soft perishable fruit, comprising: a box having bottom, side and end walls and a substantially open top and transparent material covering the major portion of said open top, but spaced from said end walls forming air passageways therebetween, a plurality of layers of said fruit positioned in said box and layers of shredded cellulose sheet material chemically neutral to said fruit and formed in the manner of excelsior separating said layers of fruit, separating the fruit in each layer, and spacing the fruit from the side, end and bottom walls of said box, the top layer of said fruit being exposed to view through said transparent material.

5. The improvement in a package for soft perishable fruit, comprising: a box formed of cardboard having bottom, side and end walls and a substantially open top, said side walls each having a normally upright integral tab extending throughout the major portion of its upper edge, an open-ended tube of transparent material encircling and extending across the bottom and side walls of said box and across said open top and bending said tabs down whereby the tabs resiliently press said tube securing it in place, the ends of said tube being spaced a short distance from the end walls of said box forming air passageways permitting air flow therebetween.

6. The improvement in a package for soft perishable fruit, comprising: a box formed of cardboard having bottom, side and end walls and a substantially open top, an open-ended tube of transparent material encircling and extending across the bottom and side walls of said box and across said open top, said side walls each having a tab extending throughout at least the major portion of its upper edge, said tabs being pressed down to horizontal, inwardly-facing positions by said tube, the ends of said tube being spaced a short distance from the ends of said box forming air passageways permitting air flow therebetween, said tabs each having a shallow depression substantially coextensive with the area of the tab abutted by said tube and said depressions continuing horizontally into the upper edges of said side walls, the abutting portions of said tube being positioned in said depressions whereby movement of said tube end-wise of said box is resisted.

References Cited in the file of this patent

UNITED STATES PATENTS

| | | |
|---|---|---|
| 617,235 | Divine | Jan. 3, 1899 |
| 1,332,985 | Jarrett | Mar. 9, 1920 |
| 2,401,944 | Levkoff | June 11, 1946 |
| 2,649,958 | Rausch | Aug. 25, 1953 |